(12) United States Patent
Walder

(10) Patent No.: US 9,322,411 B2
(45) Date of Patent: Apr. 26, 2016

(54) COUPLING, ROTOR, AND ASSEMBLY FOR A PUMP

(75) Inventor: Marcel Walder, Hueckeswagen (DE)

(73) Assignee: Magna Powertrain Hueckeswagen GmbH, Huegeswagen (DE)

( * ) Notice: Subject to any disclaimer, the term of this patent is extended or adjusted under 35 U.S.C. 154(b) by 148 days.

(21) Appl. No.: 13/988,100

(22) PCT Filed: Nov. 24, 2011

(86) PCT No.: PCT/DE2011/075287
§ 371 (c)(1),
(2), (4) Date: May 17, 2013

(87) PCT Pub. No.: WO2012/097785
PCT Pub. Date: Jul. 26, 2012

(65) Prior Publication Data
US 2013/0243516 A1    Sep. 19, 2013

(30) Foreign Application Priority Data

Dec. 7, 2010  (DE) .......................... 10 2010 061 074

(51) Int. Cl.
| | | |
|---|---|---|
| *F16C 11/06* | (2006.01) | |
| *F16D 3/80* | (2006.01) | |
| *F16L 17/00* | (2006.01) | |
| *F04D 29/06* | (2006.01) | |
| *F16D 1/108* | (2006.01) | |
| *F16D 3/04* | (2006.01) | |
| *F04D 29/20* | (2006.01) | |

(52) U.S. Cl.
CPC ................ *F04D 29/06* (2013.01); *F04D 29/20* (2013.01); *F16D 1/108* (2013.01); *F16D 3/04* (2013.01); *Y10T 403/25* (2015.01)

(58) Field of Classification Search
CPC ......... F04D 29/06; F04D 29/20; F16D 1/108; F16D 3/04; F16D 1/00; F16D 2001/103; F16D 3/265
USPC ............... 403/1, 34, 35, 37, 38, 39, 300, 312, 403/354–356, 374.3, 374.4, 383; 464/7, 464/182, 16, 156
See application file for complete search history.

(56) References Cited

U.S. PATENT DOCUMENTS

| 2,813,409 A | 11/1957 | Wolcott |
| 4,704,096 A * | 11/1987 | Marek ........................... 464/156 |
| 5,685,274 A * | 11/1997 | Helmbrecht et al. ......... 123/450 |

(Continued)

FOREIGN PATENT DOCUMENTS

| DE | 102009040510 A1 * | 3/2010 |
| EP | 1398518 A2 | 3/2004 |

(Continued)

*Primary Examiner* — Gregory Binda
*Assistant Examiner* — Nahid Amiri
(74) *Attorney, Agent, or Firm* — Davidson, Davidson & Kappel, LLC

(57) ABSTRACT

A coupling for pump, in particular a vacuum pump is provided. The coupling is configured for connecting to a rotor of the pump. The coupling includes a receiving body and at least one feed for lubricant. The receiving body includes a rotor-side end face and has a rotor-coupling region extending from the rotor-side end face. The rotor-coupling region is configured for drivingly engaging an end of the rotor. The lubricant feed is in fluid communication with the rotor-coupling region and configured for supplying the lubricant to the rotor-coupling region.

12 Claims, 2 Drawing Sheets

(56) References Cited

U.S. PATENT DOCUMENTS

| | | | |
|---|---|---|---|
| 6,036,435 A * | 3/2000 | Oklejas | 415/111 |
| 6,196,922 B1 * | 3/2001 | Hantschk et al. | 464/16 |
| 6,203,439 B1 * | 3/2001 | Tychsen et al. | 464/156 |
| 7,051,690 B2 * | 5/2006 | Dietz | 123/90.17 |
| 7,220,057 B2 * | 5/2007 | Hoppe | 384/280 |
| 7,390,179 B2 * | 6/2008 | Reinhart et al. | 418/55.3 |
| 7,945,192 B2 * | 5/2011 | Sato | 399/167 |
| 2010/0087260 A1 * | 4/2010 | Maki et al. | 464/102 |
| 2011/0020085 A1 * | 1/2011 | Glaser et al. | 408/144 |
| 2012/0219403 A1 * | 8/2012 | Riley et al. | 415/170.1 |

FOREIGN PATENT DOCUMENTS

| | | |
|---|---|---|
| FR | 2877702 A1 | 5/2006 |
| WO | WO 2010043191 A1 | 4/2010 |

* cited by examiner

COUPLING, ROTOR, AND ASSEMBLY FOR A PUMP

The present invention relates to a coupling, a rotor, and an assembly for pump, in particular a vacuum pump.

BACKGROUND

A coupling for a pump, in particular a vacuum pump, having a rotor-coupling region for a coupling element of the rotor and a drive-coupling region for a coupling element of the drive is known from International Publication WO 2010/043191 A1.

SUMMARY OF THE INVENTION

It is an object of the present invention to prolong the lifetime of a pump, in particular a vacuum pump having a coupling and/or a rotor.

In a coupling for a pump, in particular a vacuum pump, the above object is achieved by providing the coupling with at least one feed means for lubricant. Oil or oil mist, for example, can be fed through the lubricant feed means to the coupling for lubrication purposes. This makes it possible to minimize wear during the operation of the coupling, and to meet endurance requirements.

In a preferred exemplary embodiment of the coupling, the lubricant feed means is disposed in a rotor-coupling region for a coupling element of the rotor. Alternatively or additionally, the or a further lubricant feed means may be disposed in a drive-coupling region for a coupling element of the drive. Preferably, the rotor-coupling region and/or the drive-coupling region is/are bounded in the axial direction by a circular disk-like main body. The terms "axial" and "radial" refer to a longitudinal axis of the coupling. "Axial" means parallel to the longitudinal axis of the coupling. "Radial" means transverse to the longitudinal axis of the coupling. The longitudinal axis of the coupling preferably coincides with the axis of rotation of the coupling.

In another preferred exemplary embodiment of the coupling, the lubricant feed means includes a lubricating groove in a rotor-side end face of the coupling. The lubricating groove has the cross-sectional shape of, for example, a rectangle or a circular arc. The lubricating groove preferably extends in a radial direction.

In a further preferred exemplary embodiment of the coupling, the lubricating groove opens into a depression of the rotor-coupling region. The depression may be engaged by an element of double-D cross section for drivingly connecting the coupling to the rotor.

In another preferred embodiment of the coupling, the lubricating groove opens into an indentation formed on the inner side of a pot wall of a pot-like receiving body. The pot-like receiving body provides the aforedescribed depression and delimits the rotor-coupling region radially. In this connection, a central region of the circular disk-like main body forms the bottom of the pot-like rotor receiving body. The pot-like receiving body is preferably integrally connected to the circular disk-like main body and extends in the axial direction. The inner contour of the pot-like receiving body is preferably adapted to the shape of the coupling element of the rotor, which preferably has a double-D cross section.

In another preferred exemplary embodiment of the coupling, two lubricating grooves are disposed diametrically in the rotor-side end face of the coupling. Both lubricating grooves open into a respective one of two indentations, which are disposed diametrically opposite to each other in pot the wall of the pot-like receiving body.

In a further preferred exemplary embodiment of the coupling, the coupling is a sintered part. The coupling according to the present invention may be manufactured particularly economically by sintering from steel powder.

In a rotor for a pump, in particular a vacuum pump, the object described above is achieved by providing the rotor with at least one means for feeding lubricant to the coupling. Oil or oil mist, for example, can be fed through the lubricant feed means to the coupling for lubrication purposes. This makes it possible to minimize wear during the operation of the coupling, and to meet endurance requirements.

In preferred exemplary embodiment of the rotor, the lubricant feed means includes a lubricating groove in a coupling-side end face of the rotor. Otherwise, the lubricating groove in the rotor may be designed similar to the lubricating groove in the coupling. Preferably, two lubricating grooves are disposed diametrically in the coupling-side end face of the rotor.

The present invention further relates to an assembly for a pump, in particular a vacuum pump, having a coupling as described above and/or a rotor as described above. Preferably, the coupling is essentially designed as an Oldham coupling. The coupling provides a stable transmission of torque between the drive shaft and the rotor of the pump. Moreover, the coupling is capable of compensating for manufacturing, assembly and mounting tolerances, in particular for parallel misalignment. Via the lubricant feed means, in particular the lubricating grooves, oil or oil mist can get between the rotor-coupling region and the rotor element of double-D cross section to provide lubrication. Thus, a lubricating film can form between the coupling and the element of double-D cross section and thereby minimize the wear of the engaging parts.

BRIEF DESCRIPTION OF THE DRAWINGS

Further advantages, features and details of the present invention will be apparent from the following description, in which various exemplary embodiments are explained in detail with reference to the drawing. In the drawing.

DETAILED DESCRIPTION

Figure 1:
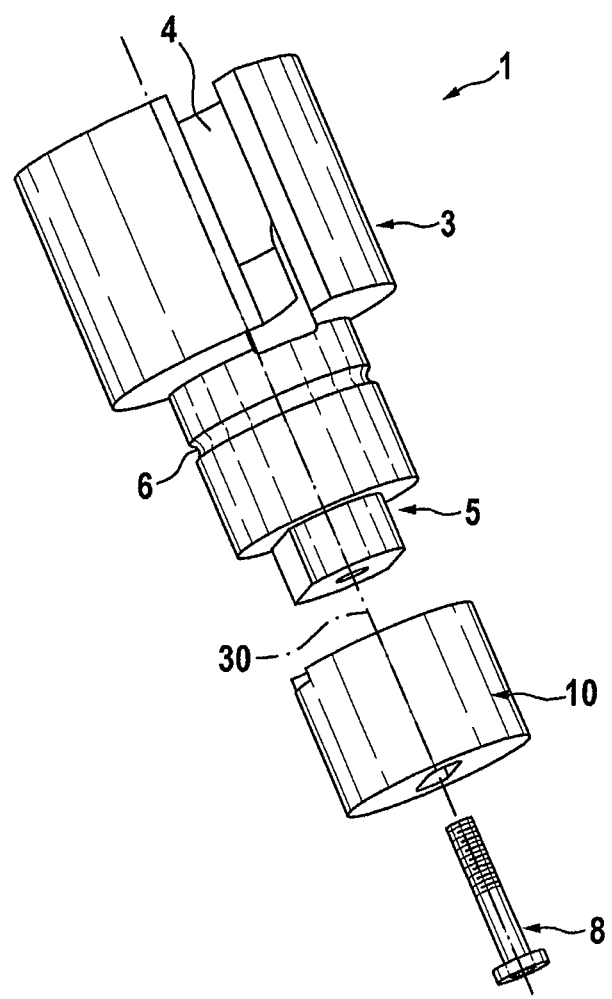
FIG. 1 is an exploded view of an assembly which includes a rotor and a coupling and forms part of a vacuum pump.

FIG. 1 shows an assembly 1 including a rotor 3 in a perspective view. Rotor 3 includes a vane-receiving slot 4 for receiving a vane (not shown) of a vacuum pump which, because of the vane, is also referred to as vane pump, and specifically as single-vane pump.

Rotor 3 has at one end an element 5 of double-D cross section. Between vane-receiving slot 4 and the element 5 of double-D cross section, rotor 3 has a circumferentially extending annular groove 6, which serves to lubricate the bearing of rotor 3. The lubricant used for lubrication can be supplied to annular groove 6 through a radial lubricant feed hole (not shown).

A coupling 10 can be attached to rotor 3 by a pin 8. Element 5 of double-D cross section engages coupling 10 such that drive torque is transferred from the coupling to rotor 3. Coupling 10 serves to drivingly couple or non-rotatably connect a drive shaft, such as a camshaft of an internal combustion engine, to rotor 3.

The vacuum pump, which is also referred to as vane pump and includes assembly 1, may be used in a motor vehicle, for example, to create a vacuum in a vacuum chamber of a brake booster.

Figure 2:
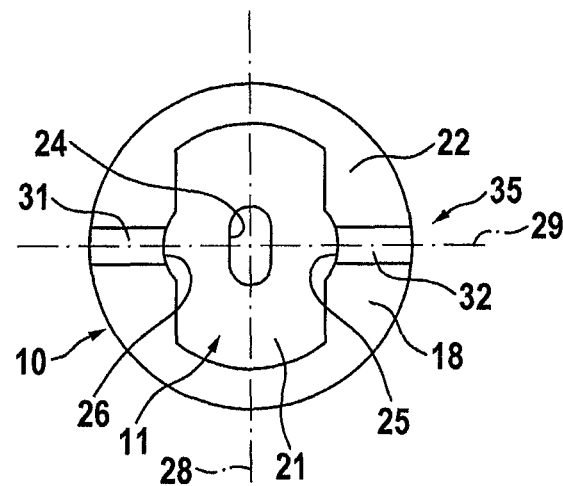
FIG. 2 is a front elevation view of the coupling of FIG. 1 looking at a rotor-coupling region.

In FIG. 2, coupling 10 is shown in a front elevation view looking at a rotor-coupling region 11. Coupling 10 may have essentially the same design as the coupling 40 disclosed in FIGS. 1 through 3 of International Publication WO 2010/043191 A1 and the description of said figures.

Coupling 10 has substantially the shape of a right circular cylinder with rotor-coupling region 11 on one end face. A drive-coupling region is formed on the other end face. The drive-coupling region engages a slotted recess on an end of a drive shaft for drivingly coupling thereto. Coupling 10 may be designed as an Oldham coupling.

Coupling 10 includes a main body which is disposed axially between the rotor-coupling region 11 and the drive-coupling region and has substantially the shape of a circular disk. At one end face, the main body merges into a pot-like receiving body 18 having a pot bottom 21 formed by the central region of the main body.

Pot bottom 21 forms an axial boundary surface of rotor-coupling region 11. Receiving body 18 further includes a pot wall 22 whose inner contour is adapted to the outer contour of the element of double-D cross section. A central through-hole 24 extends through the main body from rotor-coupling region 11 to the drive-coupling region. Through-hole 24 is in the form of a slotted hole.

Pot wall 22 has a circular outer contour. The inner contour of pot wall 2 has the shape of a slotted hole having two straight sides. At the ends of the straight sides, the slotted hole is bounded by two circular arcs. In the middle of the straight sides, the slotted hole has two outwardly directed recesses or indentations 25, 26.

In the front elevation view of FIG. 2, two orthogonal cross-axes 28, 29 are plotted. The two cross-axes 28, 29 intersect at a point through which the longitudinal axis, or axis of rotation, of coupling 10 extends perpendicularly into the plane of the paper. The longitudinal axis, or axis of rotation, of coupling 10 is designated 30 in FIGS. 1 and 3.

The circular arcs of the slotted hole representing the inner contour of pot wall 22 and the circle representing the outer contour of pot wall 22 are concentric, or optionally eccentric, with respect to the point of intersection of cross-axes 28, 29. The recesses or indentations 25, 26 are curved convexly outwardly with respect to the point of intersection of cross-axes 28, 29.

Two lubricating grooves 31, 32 are formed in pot wall 22 to provide a lubricant feed means 35. Lubricating grooves 31, 32 each extend from a respective one of indentations 26, 25 radially outwardly along cross-axis 29. In the region of recesses or indentations 25, 26, the two lubricating grooves 31, 32 open radially inwardly into rotor-coupling region 11, which is bounded by pot wall 22.

Figure 3:
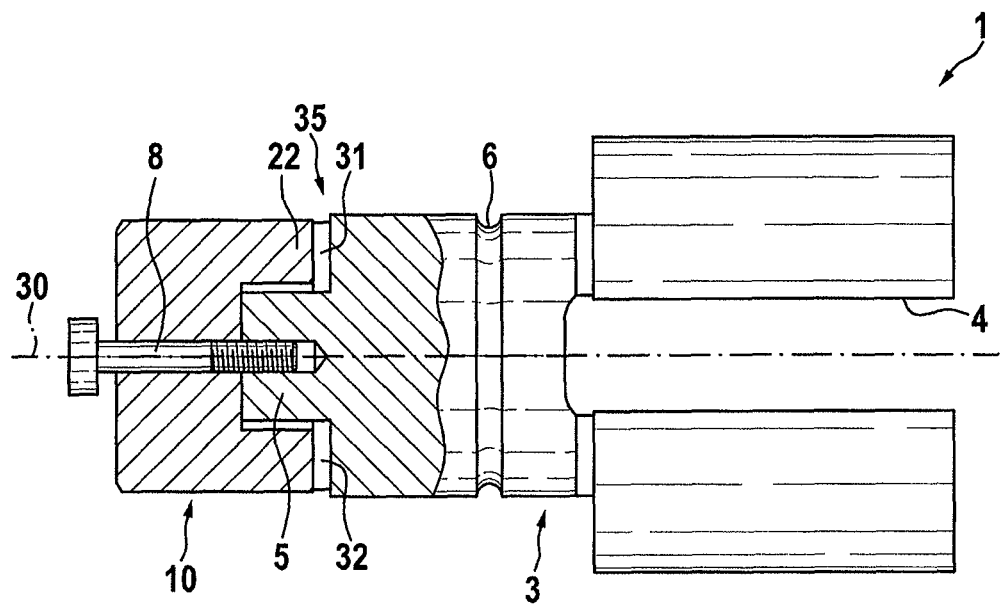
FIG. 3 is a partially cross-sectional view of the assembly of FIG. 1 showing the coupling in a mounted condition.

In the longitudinal cross-section of FIG. 3, coupling 10 is shown mounted to rotor 3 by pin 8. In the cross-sectional view, which is taken along cross-axis 29 in FIG. 2, it can be seen that, through lubricating grooves 31, 32, oil or oil mist that has been fed in the bearing region of rotor 3 and, therefore, also surrounds coupling 10, gets easily between the element of double-D cross section and pot wall 22 of coupling 10 through lubricating grooves 31, 32 [sic].

During operation of the vacuum pump provided with assembly 1, the lubricant supplied through the lubricant feed means and annular groove 6, for example, in the bearing region of rotor 3, also causes an oil film to form between element 5 of double-D cross section and pot wall 22. This makes it possible to minimize wear on coupling 10 and on element 5 of double-D cross section, and to meet endurance requirements to a large extent. In FIG. 3, it can be seen that lubricating grooves 31, 32 may also be formed in the end face of rotor 3 that face coupling 10 in order to provide lubricant feed means 35.

LIST OF REFERENCE NUMERALS 1 assembly
3 rotor
4 vane-receiving slot
5 element of double-D cross section
6 annular groove
8 pin
10 coupling
11 rotor-coupling region
18 receiving body
21 pot bottom
22 pot wall
24 through-hole
25 indentation
26 indentation
28 cross-axis
29 cross-axis
30 axis of rotation
31 lubricating groove
32 lubricating groove
33 lubricant feed means

What is claimed is:

1. A coupling for a pump configured for connecting to a rotor of the pump comprising:
    a receiving body including an outer circumferential surface and a flat rotor-side end face intersecting the outer circumferential surface, the receiving body having a rotor-coupling region extending from the rotor-side end face, the rotor-coupling region configured for drivingly engaging an end of the rotor; and
    a feed for lubricant, the lubricant feed being in fluid communication with the rotor-coupling region and configured for supplying the lubricant to the rotor-coupling region, the lubricant feed including a lubricating groove recessed into the rotor-side end face of the coupling toward the receiving body, the rotor-coupling region including a depression extending into the receiving body from the rotor-side end face, the lubricating groove extending radially from the outer circumferential surface of the receiving body to the rotor-coupling region.

2. The coupling as recited in claim 1 wherein the lubricant feed includes two lubricating grooves disposed diametrically in the rotor-side end face.

3. The coupling as recited in claim 1 wherein the coupling is a sintered part.

4. A vacuum pump comprising the coupling as recited in claim 1.

5. The coupling as recited in claim 1 wherein the receiving body is pot shaped and includes a pot bottom axially offset from the rotor-side end face and a pot wall extending axially from the rotor-side end face to the pot bottom.

6. The coupling as recited in claim 5 wherein the lubricating groove opens into a radially extending indentation formed on an inner side of the pot wall of the pot shaped receiving body.

7. The coupling as recited in claim 6 wherein the radially extending indentation is arc shaped, the lubricating groove extending radially into the receiving body and intersecting a middle of the arc shape of the radially extending indentation.

8. The coupling as recited in claim 7 wherein the receiving body includes a second pot wall extending axially from the rotor-side end face parallel to the pot wall, the lubricant feed including a second lubricating groove opening into a second radially extending indentation formed on an inner side of the second pot wall.

9. The coupling as recited in claim 5 wherein the pot bottom includes a through-hole extending therethrough.

10. The coupling as recited in claim 9 further comprising a drive-coupling region formed on another end face opposite of the rotor-side end face configured for coupling to a drive shaft.

11. The coupling as recited in claim 10 wherein the drive-coupling region includes a through-hole extending into the receiving body.

12. The coupling a recited in claim 1 wherein the coupling is an Oldham coupling.

* * * * *